United States Patent

Hernacki et al.

(10) Patent No.: US 7,665,134 B1
(45) Date of Patent: Feb. 16, 2010

(54) PROFILING USERS BASED ON ARTIFICIALLY CONSTRUCTED DECEPTIVE CONTENT

(75) Inventors: Brian Hernacki, San Carlos, CA (US); John Harrison, Sunnyvale, CA (US)

(73) Assignee: Symantec Corporation, Cupertino, CA (US)

(*) Notice: Subject to any disclaimer, the term of this patent is extended or adjusted under 35 U.S.C. 154(b) by 900 days.

(21) Appl. No.: 11/044,615

(22) Filed: Jan. 26, 2005

(51) Int. Cl.
*G06F 7/04* (2006.01)
*H04L 9/00* (2006.01)
*G06F 11/30* (2006.01)

(52) U.S. Cl. .............. 726/22; 726/23; 726/24; 726/25; 726/26; 726/27; 713/161; 713/162; 713/163; 713/164; 713/165

(58) Field of Classification Search .......... 726/23, 726/22
See application file for complete search history.

(56) References Cited

U.S. PATENT DOCUMENTS

| 5,440,723 A * | 8/1995 | Arnold et al. ............... 714/2 |
| 2004/0083129 A1 * | 4/2004 | Herz ........................... 705/10 |
| 2004/0117654 A1 * | 6/2004 | Feldman et al. ............ 713/201 |

* cited by examiner

*Primary Examiner*—Longbit Chai
(74) *Attorney, Agent, or Firm*—Hunton & Williams LLP (57) ABSTRACT

Profiling a user is disclosed. The user's behavior with respect to specially designed content comprised of one or more units of content is monitored. The specially designed content is designed such that one or more characteristics of the user may be inferred based at least in part on the user's behavior with respect to the content. One or more characteristics of the user is/are inferred based at least in part on the user's behavior with respect to the specially designed content.

32 Claims, 10 Drawing Sheets

PROFILING USERS BASED ON ARTIFICIALLY CONSTRUCTED DECEPTIVE CONTENT

FIELD OF THE INVENTION

The present invention relates generally to computers. More specifically, profiling users based on artificially constructed deceptive content is disclosed.

BACKGROUND OF THE INVENTION

Security is an important administrative task in computers and networks. Unauthorized or even authorized users may try to obtain access to resources for a detrimental purpose. Pranksters may be intent on defacing a company's website. A disgruntled, soon-to-be-laid-off employee may be stealing valuable trade secrets. A hacker may be searching computers networked to the Internet for his/her next identity theft victim. Security systems, applications, or processes are employed to prevent and detect intrusions and other threats. However, in a typical environment such security systems, applications, or processes generate a substantial amount of information, in many cases more than can be effectively processed in real time given the typically limited administrative and processing resources available. Given the potentially overwhelming amount of security-related information requiring attention, security personnel attempt to prioritize such information so that the most serious security threats are addressed in a timely manner.

Although profiling intruders based on their actions with respect to the protected environment may be useful in performing such prioritization and/or in otherwise determining an appropriate response to an intruder's activities, it is often a difficult and manual task. As used herein, an "intruder" may be any unauthorized user or an otherwise authorized user engaging in an unauthorized activity. The unconstrained environment of a typical computer system or network, or even a system specifically designed to lure and monitor the behavior of intruders (e.g., a honeypot), makes interpretation of an intruder's behavior in an automated manner difficult. Profiling based on one or more characteristics of an intruder associated with a security incident or information is therefore sometimes done manually by a computer administrator. However, manual profiling takes the computer administrator away from other tasks and often cannot be performed quickly enough to be useful in responding to threats in real time. Automatically profiling an intruder would be useful in situations such as these.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Profiling users using artificially constructed deceptive content is disclosed. In one embodiment, the content is specifically designed such that an intruder's behavior with respect to the artificial content is highly indicative of one or more characteristics of interest. An intruder's behavior with respect to other types of content is typically too open-ended to interpret in a manner that supports automatically determining one or more characteristics of an intruder. By creating a bounded environment where interpretation of behavior is limited, one or more characteristics of interest may be inferred based at least in part on an intruder's behavior with respect to artificially constructed deceptive content.

Figure 1:
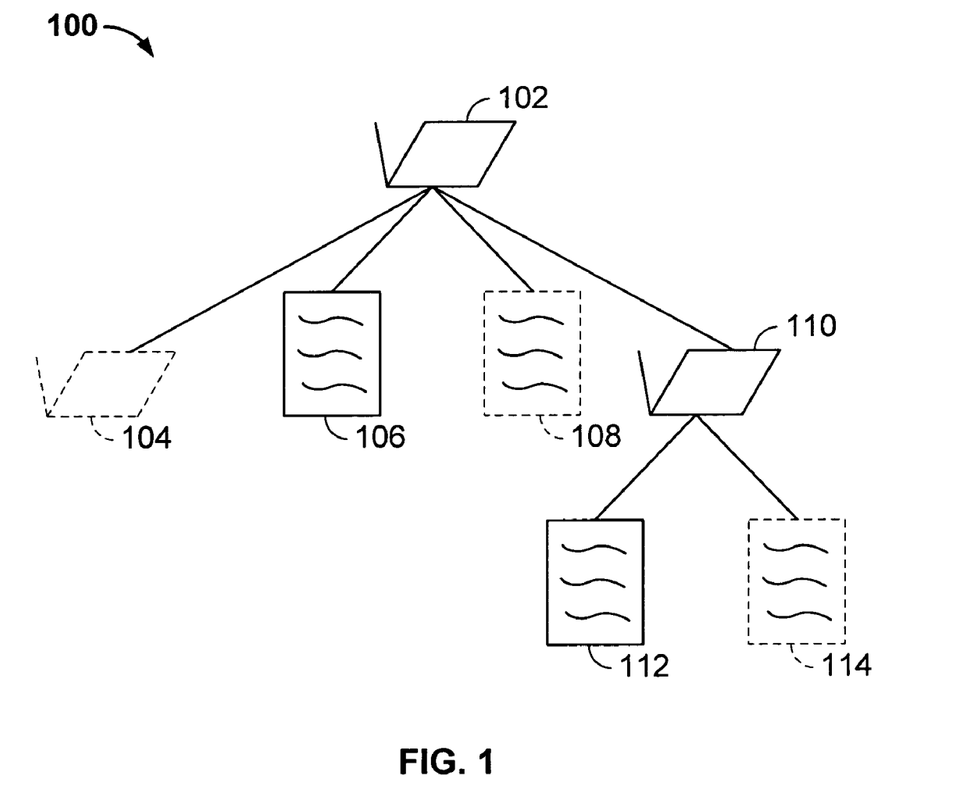
FIG. 1 illustrates an environment in which artificially constructed deceptive content is deployed in one embodiment.

FIG. 1 illustrates an environment in which artificially constructed deceptive content is deployed in one embodiment. In the example shown, the environment (100) is a computer, comprising a central processing unit (CPU), input/outputs, memory and storage. Other embodiments include, but are not limited to, a router, a file server, or a storage device. The main directory (102) is a directory in the environment (100). Before the artificially constructed content is deployed, the contents of the main directory (102) are a file (106), a directory (110), and a file (112) within the directory (110). Typically these are genuine contents of the environment created by an application or a user. Even after the artificially constructed content is deployed, usage of the genuine files and directory continue to function normally. In the example shown, three items of artificially constructed content are deployed in the environment (100). In this embodiment, the artificially constructed content takes the form of directories or files. Some embodiments construct artificial content to take different forms, such as an executable, an application, data or other object. An artificially constructed directory (104) and an artificially constructed file (108) are deployed in the main directory (102) and an artificially constructed file (114) is deployed in a genuine directory (110). Artificially constructed content is thus deployed in an environment alongside preexisting, genuine files. Usage of preexisting, genuine files and the creation and usage of new, genuine files function normally even in the presence of artificially constructed content. This is one example of an environment in which artificially constructed content is deployed and is not meant to be exhaustive.

In one embodiment, the preexisting files (106 and 112) and preexisting directory (110) comprise artificial or other deceptive content not designed to facilitate the inference of one or more characteristics of an intruder (e.g., a honeypot or other deception system). In such a system, additional artificial content designed to facilitate the inference of one or more such characteristics, such as artificial directory (104) and artificial files (108 and 114) in the example shown, may be added and used as described herein to infer one or more characteristics of an intruder.

Figure 2:
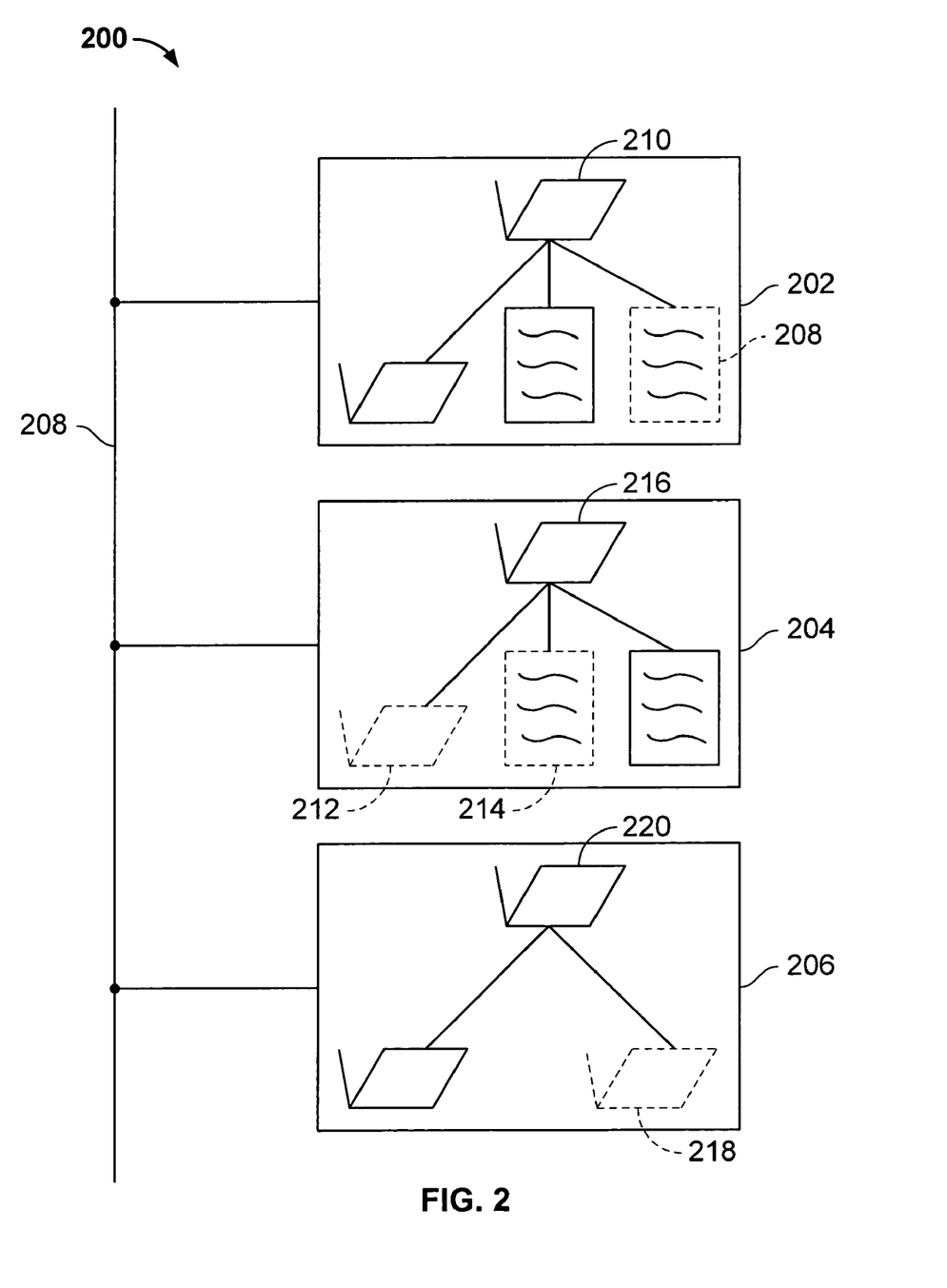
FIG. 2 illustrates a distributed environment in which artificially constructed deceptive content is deployed in one embodiment.

FIG. 2 illustrates a distributed environment in which artificially constructed deceptive content is deployed in one embodiment. In this example, the environment (200) is a network of computers. The first computer (202), second computer (204) and third computer (206) are connected together via a common network (208), e.g., a TCP/IP network. In some embodiments a wireless network (e.g., Bluetooth or Wifi) or cellular phone technology (e.g., TDMA or GSM) is employed. Artificially constructed content is deployed in each of the three computers in this example, but depending on the environment, user preferences, and other factors in other embodiments, one or more computers may not have any artificial content deployed in them. An artificially constructed file (208) is deployed in the main directory (210) of the first computer (202). An artificially constructed directory (212) and an artificially constructed file (214) are deployed in the main directory (216) of the second computer (204). An artificially constructed directory (218) is deployed in the main directory (220) of the third computer (206). Even after artificially constructed content is deployed, usage of preexisting, genuine files and the creation and usage of new, genuine files function normally. This is one example of a distributed environment in which artificially constructed deceptive content is deployed.

There are many embodiments of a distributed environment in which artificially constructed deceptive content is deployed. In some embodiments, the distributed environment (200) comprises a network of routers and one or more of the three devices (202, 204 and 206) are routers. Artificially constructed content is deployed in one or more of the three devices. In some embodiments, the environment is a company network and the three devices (202, 204 and 206) represent various subsets of the company network. For example, the company network may be divided by types of operating systems with the three devices representing three different operating systems within the company network. The division may follow geographic divisions with the first device (202) representing the West Coast local area network (LAN), the second device (204) representing the Midwestern LAN and the third device (206) representing the East Coast LAN. In some embodiments, access to different areas of the company network is restricted according to an employee's job function. For example, the three devices may represent the engineering area, the operations area and the corporate area respectively. Partitioning of devices is an artificial assignment and the partitions do not need to be real nor homogenous.

In some embodiments, one or more of the systems 202, 204, and 206 may be protected by one or more network security systems, applications, or processes not applicable to one or more of the other systems, such that access by an unauthorized user of artificial content deployed as described herein may indicate that the intruder defeated the security measure(s) configured to prevent such access, from which fact information may be inferred about the intruder's level of skill (e.g., if the intruder used an exploit to evade or otherwise defeat the measure(s)) and/or indicate that the intruder is (or has an accomplice who is) an insider, depending on the circumstances. In this way, the location in which the artificial deceptive content is placed within the deceptive environment, and not just the nature of the content itself, may be used to infer one or more characteristics about the intruder, as described more fully below.

Figure 3:
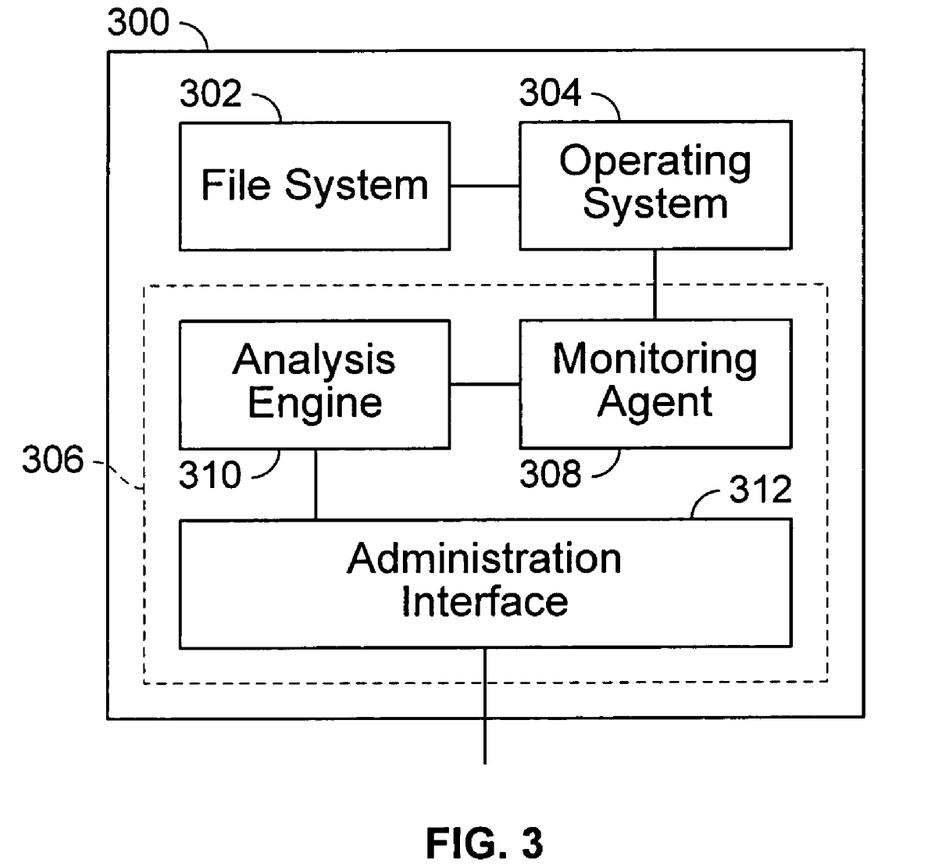
FIG. 3 is a block diagram of an embodiment of a system that profiles an intruder using artificially constructed deceptive content.

FIG. 3 is a block diagram of an embodiment of a system that profiles an intruder using artificially constructed deceptive content. In this example, the system (300) is a computer. A file system (302) and an operating system (304) are two typical components of a computer. The file system (302) is responsible for storing and retrieving files. Management of the files is controlled by the operating system (304). Commands such as read, write, copy and delete are performed by the operating system (304) on the contents of the file system (302). In some embodiments the environment (100) comprises the system (300) and the main directory (102) is a directory stored in the file system (302). The artificial contents (104, 108 and 114) and genuine contents (106, 110 and 112) are likewise stored in the file system (302).

In one embodiment, a monitoring agent (308), included in a group of specialized components (306) configured to profile a user using artificially constructed deceptive content, intercepts and/or receives a copy of file system calls made via the operating system (304) and records each time a file is accessed the name of the file, the time of the interaction, the user who accessed the file, and the action performed on the file. In some embodiments a pull interface is implemented between the operating system (304) and the monitoring agent (308). The operating system (304) transmits information regarding access to the file system (302) when initiated by the monitoring agent (308). The monitoring agent (308) is responsible in this case for determining when to retrieve the information. Some embodiments employ a push interface in which the operating system (304) determines when to send information to the monitoring agent (308). Responsibility in that case is with the operating system (304) to determine when to send information.

In some embodiments the monitoring agent (308) has additional functionality. For example, the monitoring agent is responsible for determining when an intruder has left the environment in some embodiments. The monitoring agent (308) may implement a timer and if no activity is reported by the operating system (304) for more than a certain amount of time, the monitoring agent (308) concludes the intruder has left the environment. Or, the monitoring agent analyzes other information from the operating system to determine that an intruder has left the system. In some embodiments, multiple intruders are profiled simultaneously and therefore the monitoring agent is responsible for tracking one or more intruders. The monitoring agent determines which access corresponds to which intruder and tracks each intruder separately. The number of intruders fluctuates as intruders enter and exit the environment and the monitoring agent tracks when intruders enter or exit the environment. These are some examples of additional responsibilities the monitoring agent has and are not meant to be exhaustive.

The analysis engine (310) is another specialized component (306) and is responsible for generating the characteristics of an intruder using information from the monitoring agent (308). In this embodiment the analysis engine (310) stores one or more characteristics of an intruder and updates the characteristics using information received from the monitoring agent (308). In some embodiments the analysis engine tracks multiple intruders simultaneously. The analysis engine (310) and the monitoring agent (308) may employ a push interface as described above. Some embodiments employ a pull interface where the analysis engine (310) asks the monitoring agent (308) for information. Indicators are passed from the monitoring agent (308) to the analysis engine (310) and convey information about access to the artificial content. For example, the indicators may include the name of the file accessed, the action performed and the time of the access. In some embodiments indicators also contain control information such as which intruder the information corresponds to and when an intruder enters or exits the system. Using the indicators the analysis engine determines any changes to the characteristics and updates the characteristics. The analysis engine (310) sends the characteristics to the administration interface (312). In some embodiments, the analysis engine (310) makes the characteristics available at all times to the administration interface (312). In some embodiments, the characteristics are sent to the administration interface (312) when the associated intruder departs the system. Alternatively, the analysis engine may send the characteristics after a certain amount of time has elapsed. A push or a pull interface may be implemented between the analysis engine (310) and the administration interface (312). An embodiment that tracks multiple intruders simultaneously may also send control information to assist in separately tracking the multiple intruders to the administration interface. For example, the control information may indicate which intruder the transmitted indicators correspond to. The control information may also indicate when an intruder enters or exits the system. The analysis engine (310) thus updates the characteristics of the intruder using indicators from the monitoring agent (308).

In some embodiments the analysis engine (310) performs additional analysis upon one or more of an intruder's characteristics. In some embodiments the analysis engine selects a profile from a set of predefined profiles using one or more of the characteristics. The set of predefined profiles are generalizations of characteristics that are accurate for a subset of intruders. Profiles are convenient to work with because subsequent processes only need to deal with a relatively small number of profiles instead of many possible combinations of characteristics. One example of a set of predefined profiles is {novice hacker, disgruntled employee, identity thief}. If an intruder's characteristics meet the criterion for one of the profiles, then the analysis engine determines that the intruder is of that profile. Typically, the criteria are defined such that an intruder only fits one of the profiles. In one embodiment, the analysis engine (310) selects from the defined set of profiles the one profile that best fits the intruder based on the characteristics inferred about the intruder based at least in part on the intruder's interaction with the artificial content deployed as described herein to permit such characteristics to be inferred. This is one example of additional analysis the analysis engine performs on an intruder's characteristics.

The administration interface (312) is responsible for interfacing with external entities, such as a management entity (e.g., by sending an alert to a network security administrator and/or displaying information via a user interface, data log, or report), or another security application or external process (e.g., by providing intruder characteristic and/or profile information to a security incident manager or other process configured to use such information in setting a priority or threat level for and/or otherwise facilitating the formulation of an appropriate response to the intruder's activities). The administration interface (312) also receives characteristics and/or profile from the analysis engine (310). In some embodiments, there are other automated security devices employed and the characteristics and/or profile are passed on to them. The other automated security devices use the information to make some decision or perform some action. For example, the administration interface (312) passes the profile to another automated security device. The other automated security device executes security countermeasures using the profile. If the profile is a specified profile, for example, the other automated security device strengthens the firewall or executes an anti-virus application. In some embodiments, the administration interface sends the characteristics to a system administrator. The system administrator uses this information separately or in conjunction with warnings from other security devices. For example, the system administrator uses the characteristics to prioritize the many security warning messages from multiple security devices. The administration interface is responsible for interfacing with management entities, such as a system administrator. Parameters requiring management input are managed by the administration interface. The administration interface determines what parameters require management input from each of the components. Queries about the parameters are then formatted and presented to the management entity. The administration interface then returns the values of the parameters to the appropriate module. For example, in one embodiment the monitoring agent (308) needs the system administrator to set the maximum number of intruders to track simultaneously. The administration interface (312) formats the query and presents it to the management entity. After the management entity returns the value of the parameter, the administration interface (312) sends the data to the monitoring agent (308).

In some embodiments, the administration interface (312) stores the characteristics of the possible intruder. When the analysis engine (310) transmits the characteristics to the administration interface (312), the administration interface (312) stores a copy of the characteristics in memory. A copy is thus available for retrieval later when requested from the administration interface. In some embodiments the stored information is used to gather empirical information. For example, a histogram of the most commonly accessed files may be created using the stored characteristics. In some embodiments the administration interface invokes other commands or processes if the profile or characteristics satisfy a condition. For example, based on the characteristics, the administration interface may execute a command to strengthen the firewall or deploy other security countermeasures.

Figure 4:
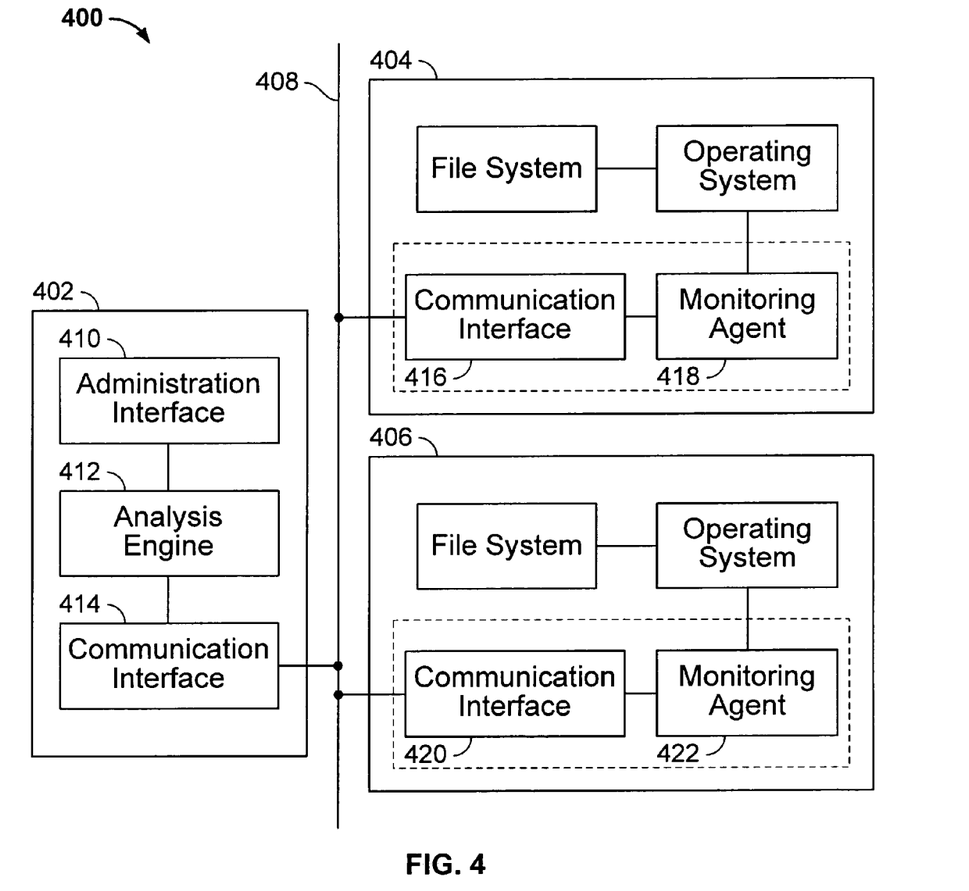
FIG. 4 is a block diagram of distributed system used in one embodiment to profile an intruder using artificially constructed deceptive content.

FIG. 4 is a block diagram of distributed system used in one embodiment to profile an intruder using artificially constructed deceptive content. The illustrated distributed system is similar to the system illustrated in FIG. 3, except the system in FIG. 4 is distributed. In this example, the distributed system (400) is a network of computers. The first computer (402), second computer (404) and third computer (406) are connected via a network (408), e.g. a TCP/IP network. In one embodiment the distributed system (400) comprises and/or is deployed in a distributed (e.g., network) environment such as the distributed environment (200) of FIG. 2. For example, in one embodiment the first device (202) is the first computer (402), the second device (204) is the second computer (404), and the third device (206) is the third computer (406). The first computer (402) contains an administration interface (410), an analysis engine (412) and a communication interface (414). The second computer (404) and the third computer (406) both contain a communication interface (416 and 420) and a monitoring agent (418 and 422). The communication interfaces (414, 416 and 420) manage communication across the network (408). In this example the network (408) is a TCP/IP network, so the communication interfaces (414, 416 and 420) implement the TCP/IP protocol. In some embodiments the first communication interface (414) signals to the other communication interfaces (416 and 420) when to transfer information across the network (408). This is one example of a distributed system that profiles an intruder using artificially constructed deceptive content.

There are many embodiments of the distributed system (400). For example, a wireless data network, a cellular phone network, or an optical network may be employed as the network (408) connecting the three devices (402, 404 and 406). In some embodiments the three devices on the network (402, 404 and 406) are file servers, routers, network storage devices or personal digital assistants (PDAs). In some embodiments the three devices are not the same type of device. The devices in the distributed system (400) may be implemented in hardware or software. For example, the first device (402) may be a computer. The administration interface (410), analysis engine (412) and communication interface (414) are implemented as a software program and run on the computer. In some embodiments the administration interface (410), analysis engine (412) and communication interface (414) are implemented as firmware and the first device (402) incorporates a microprocessor. Alternatively, the modules may be implemented in hardware, such as an ASIC or FPGA. The communication interfaces (416 and 420) and monitoring agents (418 and 422) on the second and third devices (404 and 406) may similarly be implemented in hardware or software. These are examples of the distributed system and are not exhaustive.

In the example shown, monitoring agents (418) and (422) monitor access to artificial content deployed in the file system of the respective hosts (404) and (406) on which the monitoring agents are installed and report information regarding such access via their associated communication interface (416 and 420 respectively) to the analysis engine (412) via the network (408) and communication interface (414). The analysis engine processes the received information in a manner similar to the operation of the analysis engine (310) of FIG. 3, as described above, and reports results via administrative interface (410). In this manner, one or more characteristics of an intruder may be inferred based on the intruder's interaction with artificial content deployed on one or more hosts associated with the network (408), such as hosts (404) and (406), as the intruder navigates through the network (408) and interacts with such hosts.

Figure 5:
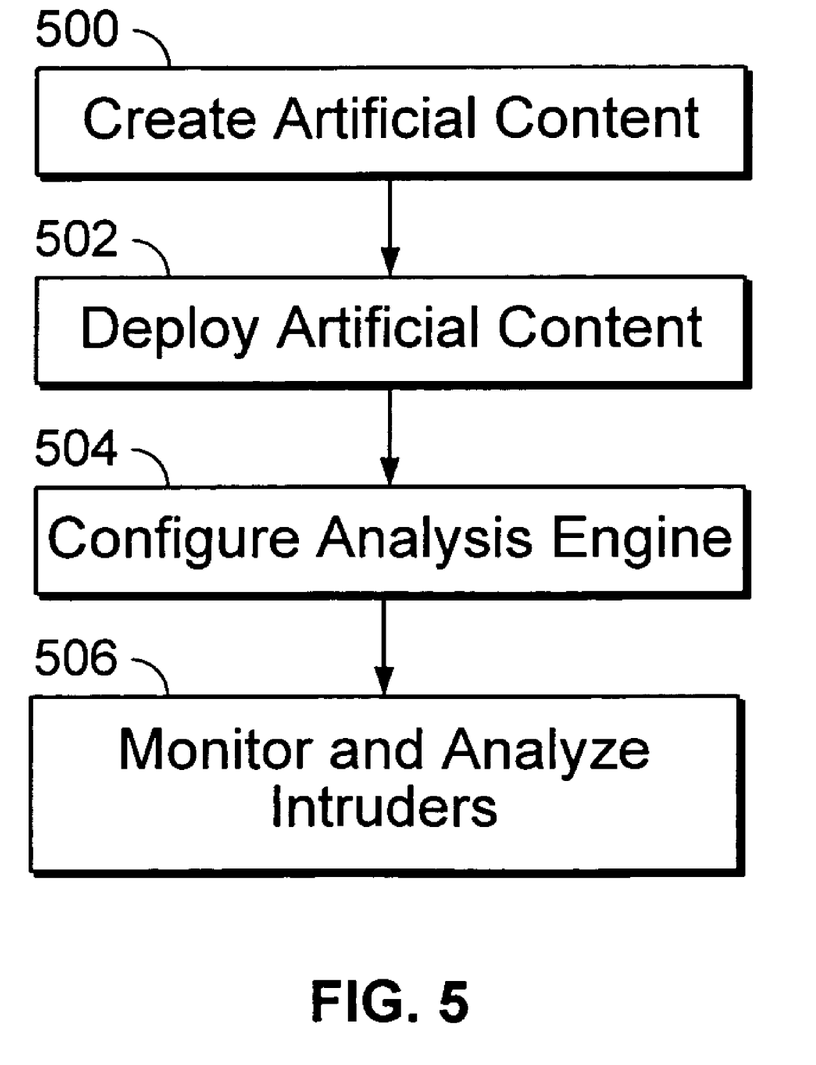
FIG. 5 is a flow chart illustrating a process used in one embodiment to create deceptive content and use the created content to profile intruders.

FIG. 5 is a flow chart illustrating a process used in one embodiment to create deceptive content and use the created content to profile intruders. Artificial content is created (500) such that an intruder's behavior with respect to the content is highly indicative of one or more characteristics of interest.

The artificial content created in (500) is used to construct a bounded environment in which the extent to which an intruder exhibits one or more characteristics of interest may be inferred with some degree of confidence quickly and in an automated manner by observing the intruder's interaction with the artificial content. The environment is "bounded" in the sense that the intruder's interaction with each unit of artificial content indicates by the nature of the content (combined in some embodiments with other parameters or information, as appropriate) the extent, in a precise and quantifiable way, to which it may be inferred that the intruder exhibits one or more characteristics associated with the unit of content, i.e., that the unit of content was designed to reveal. In some embodiments the artificial content is created without knowledge of the deployment environment. The artificial content is deployed (502) in an environment in which intruders are to be profiled using the artificial content. In one embodiment, in (502) units of the artificial content (e.g., individual artificially created files, directories, and/or other objects) are deployed in a file system in each of one or more host systems comprising the environment. The analysis engine to be used to infer one or more characteristics based on an intruder's interaction with the artificial content is configured (504). For example, the analysis engine may be configured as described more fully below in connection with FIG. 8 to receive from one or more monitoring agents reports of interactions by an intruder with an unit of artificial content and/or other content on the system and determine the extent to which each such reported interaction indicates the intruder exhibits one or more characteristics of interest. Intruders are monitored and their interactions with the environment analyzed (506). In one embodiment, the analysis is performed by the analysis engine configured in (504). Intruders are monitored to observe their behavior with respect to artificial content and the intruder's behavior with respect to the artificial content is analyzed to determine characteristics of interest.

Figure 6:
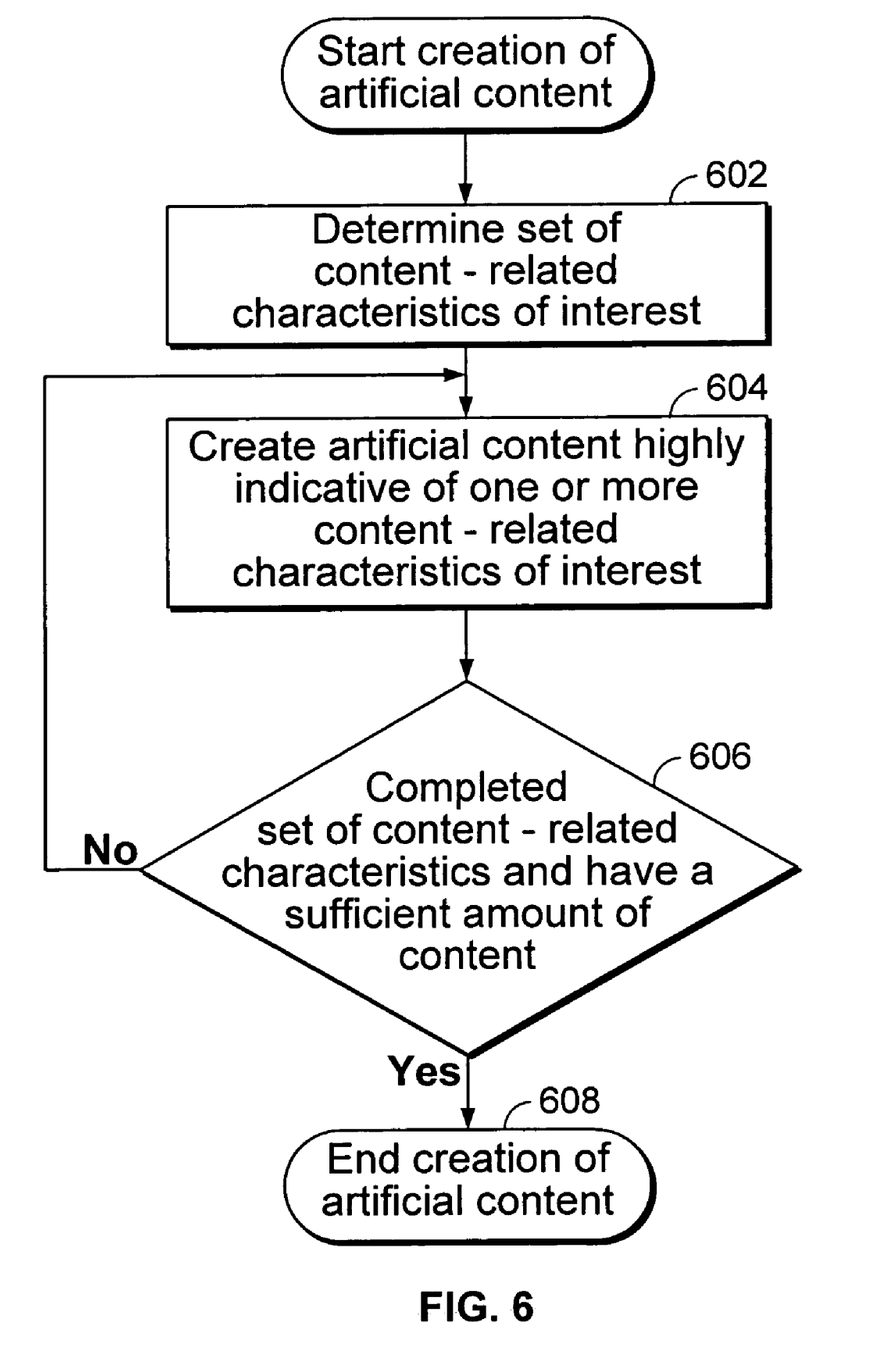
FIG. 6 is a flow chart illustrating a process used in one embodiment to create artificial content to profile an intruder.

FIG. 6 is a flow chart illustrating a process used in one embodiment to create artificial content to profile an intruder. A set of content-related characteristics of interest are determined (602). In one embodiment characteristics are quantified and assigned values that indicate the extent to which the intruder exhibits the characteristic. For example, an intruder with the characteristic scores {characteristic A=1, characteristic B=10, characteristics C=2} on a scale of [0, 10] exhibits characteristic B strongly, but exhibits characteristics A and C only weakly. Content-related characteristics of interest are characteristics that are determined based at least in part on an intruder's behavior with respect to one or more units of content (e.g., reading a file, deleting a file). Characteristics that are determined from an intruder's behavior with respect to the environment (e.g., how many security barriers the intruder breached, how familiar the intruder was with the environment, etc.) are not content-related characteristics. An intruder's behavior with respect to content may include the action performed on the artificial content or actions not performed on the artificial content. For example, if an intruder copies research notes of a new product but bypasses employee records, the characteristics might be {interested in non-public employee data=2, interested in intellectual property assets=8}. These are some examples of content-related characteristics of interest.

In another example, the content-related characteristic of interest is the likelihood an intruder is an insider. For example, searching a local host file or log file and then attempting to access one or more hosts listed in the files is content-related behavior that may be indicative of an outsider. Conversely, an intruder attempting to access hosts without a prior search may be indicative of an insider. Accessing a host directly using an IP address may be even more highly indicative of an insider. A short access to files may be indicative of an insider. Two examples of short access to files are copying a file without listing directories or searching for a file by file name where the file is an internal-only file.

In a typical embodiment, a security expert determines the set of content-related characteristics of interest, drawing on his/her familiarity and expertise regarding intruders and security violations. However, this is not a requirement. Some or all of the process of determining the set of content-related characteristics of interest may be automated. In some embodiments, the process is an adaptive one. For example, as intruders interact with artificial content, the process of determining the set of content-related characteristics of interest changes based on the interaction of intruders with artificial content. One or more algorithms or methods may be applied to optimize the adaptive process. In some embodiments the adaptive process is implemented on a real-time basis.

In some embodiments, multiple sets of content-related characteristics of interest are created to enable configurable deployment of the artificial content. Each set is applicable to one or more subgroups of intruders and configuration options allow the management entity to select the appropriate associated artificial content. For example, some sets of characteristics of interest apply to profiling intruders of systems of large corporations while some sets apply to profiling intruders of a single computer at home. Some sets of characteristics of interest are appropriate for systems of software businesses while some sets are appropriate for the systems of financial services companies. These are some examples of determining multiple sets of content-related characteristics of interest.

Artificial content each unit of which is highly indicative of one or more of the characteristics of interest is created (604). In one embodiment, more than one unit of artificial content may be highly indicative of the same characteristic of interest. Some aspects to consider while creating the artificial content may include the filename, the type of file (e.g., a C++ file or a binary file), or the contents of the file (e.g., a special keyword in the file or a specific header in the file).

In some embodiments empirical data from a plurality of intruders is used to improve determination of the characteristics and/or creation of artificial content. For example, empirical data is gathered from a plurality of intruders. From the data it is determined that intruders who interact with a certain set of files very often have a certain characteristic. Artificial content modeled after the set of files from empirical data is then created to be highly indicative of that characteristic.

It is determined whether a sufficient body of artificial content has been created (606). If it is determined in (606) that the body of content created thus far does not include at least one unit of artificial content for each content-related characteristic of interest, additional content is created at (604). Otherwise, the process of FIG. 6 ends (608).

Figure 7:
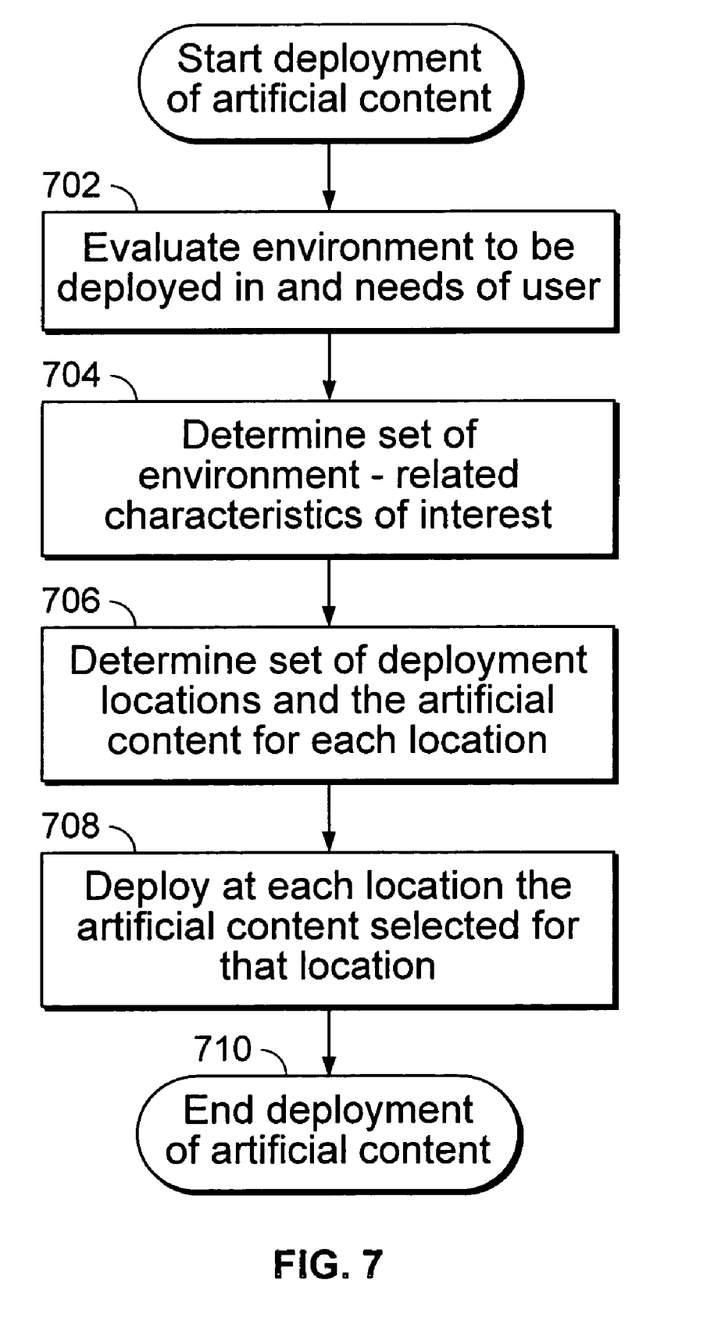
FIG. 7 is a flow chart illustrating a process used in one embodiment to deploy artificially constructed deceptive content used to profile an intruder.

FIG. 7 is a flow chart illustrating a process used in one embodiment to deploy artificially constructed deceptive content used to profile an intruder. The environment in which the artificial content is to be deployed and the needs of the user (e.g., network owner or other stakeholder) on whose behalf the artificial content is being deployed are evaluated (702). In some embodiments, parts of the evaluation process are automated. The evaluation may include identifying security measures (e.g., firewalls, password protected areas of the environment, etc.), analyzing the network (e.g., network topography, the number of computers on a network, the network protocol used, etc.), analyzing the infrastructure (e.g., the types of devices in the environment, device capabilities, hierarchy of the environment, etc.) or identifying users of the environment (e.g., many anonymous users, known but unrestricted users, known and approved users, etc.). In some embodiments the needs of the user are ascertained through a graphical user interface (GUI). The GUI may have questions with multiple choice responses and be interactive. For example, after determining the environment in which the artificial content is deployed, the GUI presents an interactive hierarchy of the directory structure. The user then specifies directories in the hierarchy to deploy artificial content in or directories in the hierarchy to deploy a higher concentration of artificial content in. In some embodiments the user identifies whether the system is residential or commercial in nature. If the system is commercial, the GUI inquires about the industry the company is in. Other questions may be about valuable assets, past security breaches and the nature of the breaches.

A set of environment-related characteristics of interest is determined (704). An environment-related characteristic is a characteristic that is determined from an intruder's behavior with respect to the environment, e.g., the location of a file or other object with which the intruder has interacted and/or time (e.g., absolute time of day, time elapsed between first contact by the intruder and interaction with an object, time elapsed between interaction with one object and subsequent interaction with the next, etc.). The intruder's behavior with respect to the environment (e.g., getting past a firewall or finding a file in a hidden directory or otherwise obfuscated) is highly indicative of an environment-related characteristic (e.g., an intruder's skill, access to inside information, physical access to a system on the internal network, etc.). A set of environment-related characteristics of interest may be {ability to bypass security devices, possession of knowledge that should be limited to legitimate users, familiarity with environment}.

A set of locations in which artificial content will be deployed is determined and the artificial content to be deployed in each location is selected (706). In some embodiments, the locations determined and content selected for each location is determined based at least in part on the evaluation of the environment made in (702) and/or the set of environment-related characteristics of interest determined in (704). In some embodiments user input is used to determine deployment locations and artificial content for each location. For example, a website is divided into a public and private area and access to the private area is restricted to registered users. The set of environment-related characteristics of interest is {ability to bypass security measures, possession of knowledge that should be limited to legitimate users, familiarity with environment}. Locations in the public area and private area are selected to determine one or more of these environment-related characteristics of interest.

Each unit of artificial content that is deployed is assigned to a deployment location or conversely each deployment location needs artificial content assigned to it. In some embodiments a portion of this process is automated. For example, constraints may be placed on possible deployment locations for artificial content by the creators of the artificial content. The creator may specify where to, or conversely where not to, deploy artificial content. It may be a location where genuine content similar to the artificial content is located or it may be a location selected to reveal an environment-related characteristic of interest. In some embodiments artificial content is given a default assignment. For example, when artificial content is created for content-related characteristics of interest, a default deployment location is assigned to it. Unless the default location is overridden, the artificial content is deployed at the default location. In some embodiments the default locations do not need to be the same location for all units of artificial content. In some embodiments the unit of artificial content is manually assigned to a deployment location. A combination of methods may be used to assign each unit of artificial content that is deployed. These are some examples of assigning each unit of artificial content to a deployment location.

The artificial content selected for each location is deployed at that location (708). For example, a script may be created with a list of the artificial content to be deployed and the associated deployment location. Once the artificial content has been deployed, the process of FIG. 7 ends (710).

Figure 8:
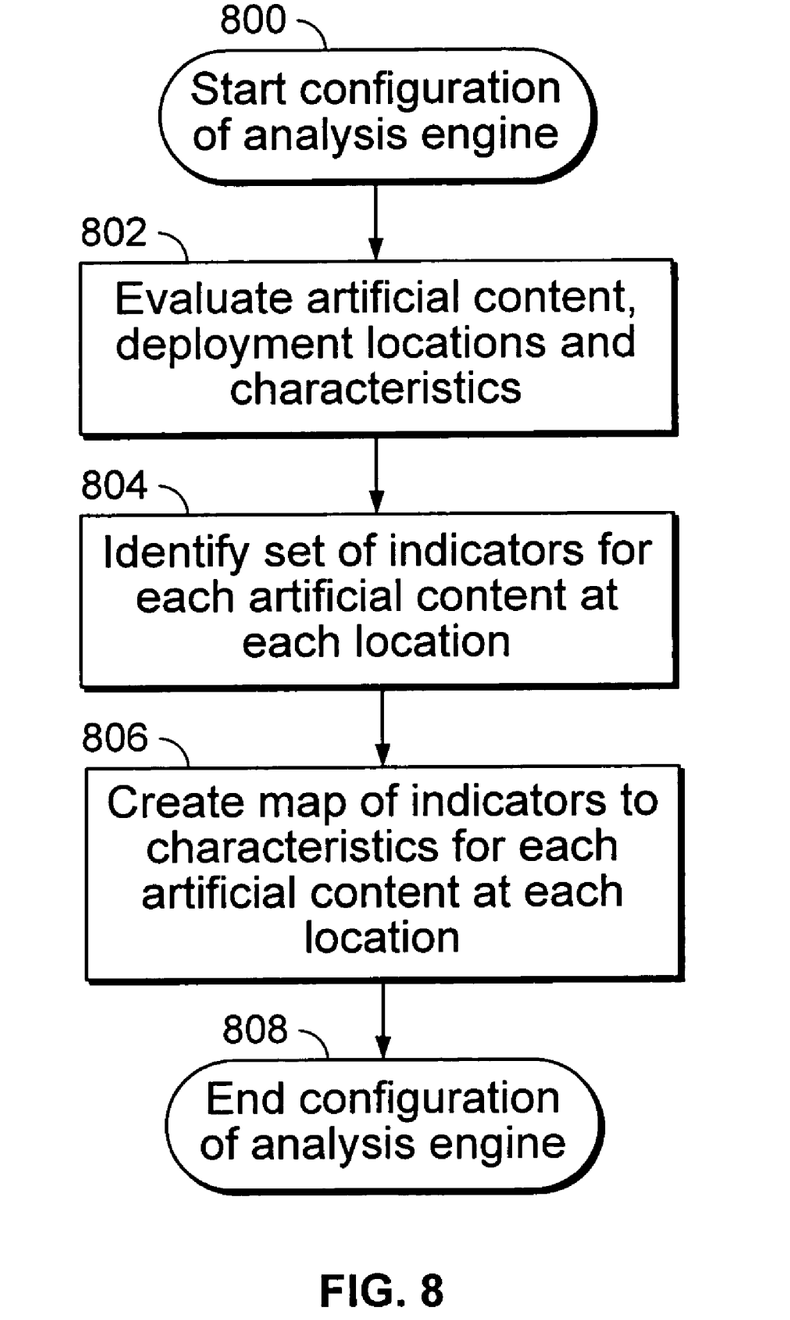
FIG. 8 is a flow chart illustrating a process used in one embodiment to configure an analysis engine to profile an intruder using artificially constructed deceptive content.

FIG. 8 is a flow chart illustrating a process used in one embodiment to configure an analysis engine to profile an intruder using artificially constructed deceptive content. For each system on which artificial content has been deployed, the artificial content, the locations in which each unit of the artificial content is deployed, and the characteristics of interest associated with each unit of content are evaluated (802). A set of indicators are identified for each unit of artificial content at each location (804). An indicator is an attribute of an intruder's interaction with the environment and/or the artificial content that can be observed and reported. For example, indicators could be the names of the files which are accessed, the timestamp of the access, or the action performed on the file. Identifying the indicators (804) depends in part on evaluating the artificial content, the locations the in which each unit of artificial content is deployed, and the characteristics of interest associated with each respective unit of artificial content (802). Using the set of indicators, a map of indicators to characteristics is created (806), after which the process ends (808). One embodiment of a map of indicators to their meaning or effect with respect to applicable characteristics of interest is illustrated in greater detail below in connection with FIG. 9.

Figure 9:
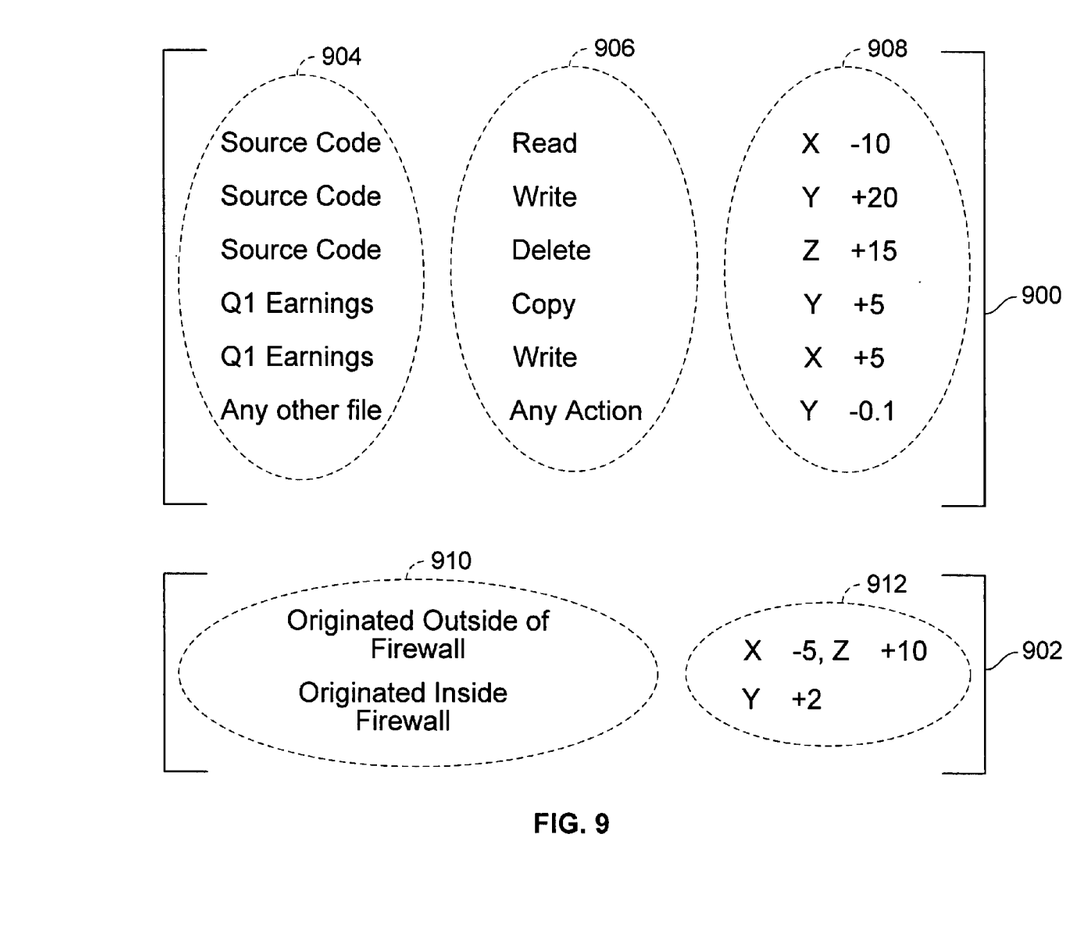
FIG. 9 illustrates one embodiment of a mapping of indicators to their meaning or effect with respect to applicable characteristics of interest.

FIG. 9 illustrates one embodiment of a mapping of indicators to their meaning or effect with respect to applicable characteristics of interest. In the example shown, a first map (900) maps content-related indicators to their effect with respect to one or more characteristics of interest and a second map (902) maps environment-related indicators to one or more characteristics of interest. In this example, the maps are in the form of a lookup table. The first map (900) contains three columns. The contents of the first column (904) are indicators and in particular are the files accessed. In this example the files are artificial source code, artificial Q1 earnings and any other file. Any other file in this example refers to any file besides the artificial source code and artificial Q1 earnings files. In some embodiments, additional information, such as the location of the file, is used to uniquely identify the file accessed. The contents of the second column (906) are also indicators, but are the actions performed on the file accessed. In this example the actions are read, write, delete, copy and any action. Any action in this example refers to any action on the file besides reading, writing, deleting or copying. The third column (908) is the change to one or more of the characteristics of the intruder if the reported indicators match the indicators in the corresponding row of the lookup table. There are three characteristics (characteristics x, y and z) and one or more of the characteristics may change depending on the entry in the lookup table. The last entry of the mapping is used to degrade characteristic y if an intruder performs any action on any file besides the artificial source code and artificial Q1 earnings.

The second map (902) is another example of mapping indicators to changes in characteristics and has one column of indicators (910) determined by the source of the intruder. The second map (902) is used to determine the effect on corresponding characteristics of interest based on whether the intruder originated outside of the firewall or in the internal network. The second column (912) contains the changes to one or more of the characteristics if the reported indicators match the indicators in the lookup table. In this second map (902), if the reported characteristics do not match the indicators in the lookup table then there is no change to the indicators. In the example shown in FIG. 9, the environment-based indicators of second map (902) map to the same set of characteristics {x, y, z} as the content-based indicators of first map (900), but in other embodiments the two sets of indicators might map to different characteristics. For example, intent may be inferred based on content-related indicators, but other characteristics such as skill, physical access, insider status, etc. may be inferred based on environment-based indicators such as those listed in second map (902). Also, while the examples shown in FIG. 9 contemplate a one dimensional set of characteristics, two or three dimensional matrices of characteristics may also be used in some embodiments.

In some embodiments there are one or more mappings of indicators to changes in characteristics. The changes in characteristics are then applied to the current characteristics. In some embodiments the mapping is performed by one or more functions. For example, characteristic $x=f_1(\text{indicators})$, characteristic $y=f_2(\text{indicators})$, etc. In such an embodiment, the characteristics themselves are directly calculated, rather than calculating a change to the characteristic and then applying that change to a baseline or current value for the characteristic.

Figure 10:
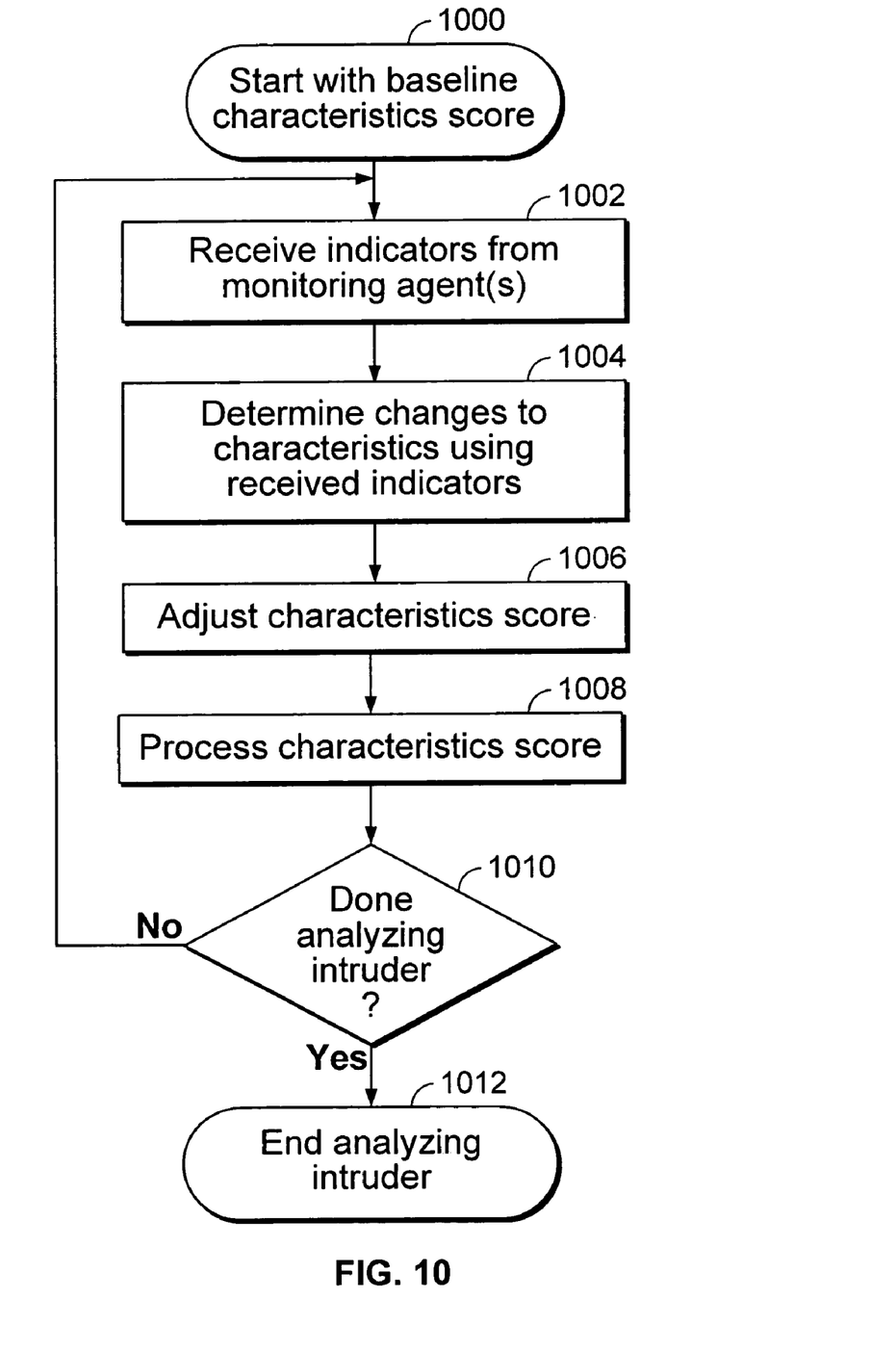
FIG. 10 is a flow chart illustrating a process used in one embodiment to monitor and analyze an intruder using artificially created deceptive content.

FIG. 10 is a flow chart illustrating a process used in one embodiment to monitor and analyze an intruder using artificially created deceptive content. In one embodiment, analysis of an intruder is performed by an analysis engine, such as analysis engine (310) of FIG. 3. Analysis of an intruder starts with a baseline characteristics score (1000). In one embodiment, the baseline characteristics score is a neutral score. For example, if the characteristics x, y and z have a range of [0, 100], the baseline characteristics score would be {characteristic x=50, characteristic y=50, characteristic z=50}. In other embodiments, the baseline score for each characteristic is determined by assigning a value based on the extent to which a legitimate user exhibits the characteristic. Indicators are received from the monitoring agent(s) (1002). Indicators convey information about access to the artificial content. For example, the analysis engine receives an indicator that an intruder read the artificial source code. The received indicators are used to determine changes to characteristics (1004). For example, using the first example mapping (900), the first entry matches the received indicator, so characteristic x is decremented by 10. The changes to the characteristics determined in (1004) are applied to adjust the characteristics score (1006). The characteristics score, in this case the baseline characteristics score since this is the first update, is updated and becomes {characteristic x=40, characteristic y=50, characteristic z=50}. The characteristics score is processed (1008). For example, the intruder is determined to fit a predefined profile based at least in part on the characteristics score. A set of predefined profiles are created, each with a range of characteristics associated with each profile, and in (1008) one profile from the set of profiles that matches the characteristics score of the intruder is selected. In some embodiments, the intruder's intent is determined using the characteristics. It is determined whether analysis of the intruder is done (1010). If the analysis is done, analysis of the intruder ends (1012). However, if analysis is not done, the next set of indicators, if any, are received and processed (1002). The analysis engine may determine it is done using information from the monitoring agent. For example, the monitoring agent reports to the analysis engine that an intruder has left the system and the analysis engine concludes the analysis is done. Or, the analysis engine may implement a timer and concludes the analysis is done after a certain amount of time elapses.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of profiling a user including:
   electronically creating one or more units of decoy content, each unit of decoy content being designed such that one or more characteristics of the user may be inferred based at least in part on the user's behavior with respect to the unit of decoy content;
   monitoring the user's behavior with respect to the one or more units of decoy content;
   inferring, using a processor, one or more characteristics of the user based at least in part on the user's behavior with respect to the one or more units of decoy content; and
   creating one or more numerical values associated with the one or more characteristics, the one or more numerical values representing one or more characteristic scores indicating an extent to which the user exhibits the one or more characteristics when performing or not performing actions with respect to the one or more units of decoy content.

2. The method as described in claim 1, wherein the user is an intruder.

3. The method as described in claim 1, further including deploying one or more of the one or more units of decoy content in a computer.

4. The method as described in claim 1, further including deploying one or more of the one or more units of decoy content in a storage device.

5. The method as described in claim 1, further including deploying one or more of the one or more units of decoy content in a network device.

6. The method as described in claim 1, further including deploying one or more of the one or more units of decoy content in a distributed system.

7. The method as described in claim 1, further including deploying one or more of the one or more units of decoy content in each of one or more hosts comprising a distributed system.

8. The method as described in claim 1, wherein monitoring includes determining when a user stops interaction with the one or more units of decoy content.

9. The method as described in claim 1, wherein the user is one of a plurality of users being profiled simultaneously.

10. The method as described in claim 1, further including processing one or more characteristics of the user.

11. The method as described in claim 1, further including selecting a profile from a set of predefined profiles based at least in part on one or more characteristics of the user.

12. The method as described in claim 1, wherein the one or more characteristics are quantified.

13. The method as described in claim 1, wherein some or all of the profiling is adaptive.

14. The method as described in claim 1, wherein creating one or more units of decoy content includes creating one or more units of decoy content appropriate for a subset of users.

15. The method as described in claim 1, wherein inferring one or more characteristics of the user includes inferring one or more of the one or more characteristics of the user based at least in part on the user's behavior with respect to an environment in which the one or more units of decoy content has been deployed.

16. The method as described in claim 1, wherein inferring one or more characteristics of the user includes inferring one or more of the one or more characteristics of the user based at least in part on a location, within an environment in which the one or more units of decoy content has been deployed, of a unit of the one or more units of decoy content with which the user has interacted.

17. The method as described in claim 1, wherein inferring one or more characteristics includes determining a change, if any, to a current value associated with one or more of the one or more characteristics based at least in part on the behavior of the user with respect to one or more of the one or more units of decoy content and applying the change.

18. The method as described in claim 1, further including determining the user's intent based at least in part on one or more of the user's characteristics.

19. The method as described in claim 1, wherein inferring one or more characteristics of the user comprises:
   receiving one or more indicators associated with a behavior by the user with respect to one or more of the one or more units of decoy content; and
   mapping the one or more indicators to a change to a current value associated with one or more of the one or more characteristics.

20. The method as described in claim 1, wherein inferring one or more characteristics of the user comprises:
   receiving one or more indicators associated with a behavior by the user with respect to one or more of the one or more units of decoy content;
   mapping the one or more indicators to a change to a current value associated with one or more of the one or more characteristics; and
   applying the change to the current value.

21. A system of profiling a user including:
   a processor adapted to electronically create one or more units of decoy content, each unit of decoy content being designed such that one or more characteristics of the user may be inferred based at least in part on the user's behavior with respect to the unit of decoy content;
   a monitoring agent configured to monitor the user's behavior with respect to the one or more units of decoy content;
   an analysis engine configured to infer one or more characteristics of the user based at least in part on the user's behavior with respect to the one or more units of decoy content, wherein each of the one or more characteristics is represented by a corresponding numerical value indicating an extent to which the user exhibits the one or more characteristics when performing or not performing actions with respect to the one or more units of decoy content.

22. The system as recited in claim 21, wherein the processor is further configured to process one or more characteristics of the user.

23. The system as recited in claim 21, wherein the processor is further configured to select a profile from a set of predefined profiles based at least in part on one or more characteristics of the user.

24. The system as recited in claim 21, wherein inferring one or more characteristics of the user includes inferring one or more of the one or more characteristics of the user based at least in part on a location, within an environment in which the one or more units of decoy content has been deployed, of a unit of the one or more units of decoy content with which the user has interacted.

25. The system as recited in claim 21, wherein the processor is further configured to determine the user's intent based at least in part on one or more of the user's characteristics.

26. The system as recited in claim 21, wherein inferring one or more characteristics of the user comprises:
receiving one or more indicators associated with a behavior by the user with respect to one or more of the one or more units of decoy content; and
mapping the one or more indicators to a change to a current value associated with one or more of the one or more characteristics.

27. A computer program product for profiling a user, the computer program product being embodied in a computer readable storage medium and comprising computer instructions, when executed by a processor, for:
electronically creating one or more units of decoy content, each unit of decoy content being designed such that one or more characteristics of the user may be inferred based at least in part on the user's behavior with respect to the unit of decoy content;
monitoring the user's behavior with respect to the one or more units of decoy content;
inferring one or more characteristics of the user based at least in part on the user's behavior with respect to the one or more units of decoy content; and
creating one or more numerical values associated with the one or more characteristics, the one or more numerical values representing one or more characteristic scores indicating an extent to which the user exhibits the one or more characteristics when performing or not performing actions with respect to the one or more units of decoy content.

28. The computer program product as recited in claim 27, the computer program product further including computer instructions for processing one or more characteristics of the user.

29. The computer program product as recited in claim 27, the computer program product further including computer instructions for selecting a profile from a set of predefined profiles based at least in part on one or more characteristics of the user.

30. The computer program product as recited in claim 27, wherein inferring one or more characteristics of the user includes inferring one or more of the one or more characteristics of the user based at least in part on a location, within an environment in which the one or more units of decoy content has been deployed, of a unit of the one or more units of decoy content with which the user has interacted.

31. The computer program product as recited in claim 27, the computer program product further including computer instructions for determining the user's intent based at least in part on one or more of the user's characteristics.

32. The computer program product as recited in claim 27, wherein inferring one or more characteristics of the user comprises:
receiving one or more indicators associated with a behavior by the user with respect to one or more of the one or more units of decoy content; and
mapping the one or more indicators to a change to a current value associated with one or more of the one or more characteristics.

* * * * *

UNITED STATES PATENT AND TRADEMARK OFFICE
CERTIFICATE OF CORRECTION

| | | |
|---|---|---|
| PATENT NO. | : 7,665,134 B1 | Page 1 of 1 |
| APPLICATION NO. | : 11/044615 | |
| DATED | : February 16, 2010 | |
| INVENTOR(S) | : Hernacki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this

Twenty-eighth Day of December, 2010

David J. Kappos
*Director of the United States Patent and Trademark Office*